(12) United States Patent
Kurimura et al.

(10) Patent No.: US 7,977,428 B2
(45) Date of Patent: Jul. 12, 2011

(54) LINEAR BLOCK COPOLYMER COMPOSITION

(75) Inventors: Hiroyuki Kurimura, Tokyo (JP); Jun Watanabe, Tokyo (JP); Takeshi Oda, Tokyo (JP); Norihiro Shimizu, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 689 days.

(21) Appl. No.: 10/549,574

(22) PCT Filed: Mar. 19, 2004

(86) PCT No.: PCT/JP2004/003717
§ 371 (c)(1),
(2), (4) Date: Sep. 19, 2005

(87) PCT Pub. No.: WO2004/085504
PCT Pub. Date: Oct. 7, 2004

(65) Prior Publication Data
US 2006/0211823 A1    Sep. 21, 2006

(30) Foreign Application Priority Data
Mar. 19, 2003 (JP) ................................. 2003-075467

(51) Int. Cl.
*C08L 53/02* (2006.01)
*C08F 297/04* (2006.01)

(52) U.S. Cl. ............... 525/89; 525/98; 525/99; 525/250; 525/271; 525/314

(58) Field of Classification Search .................... 525/98, 525/99, 250, 271, 314, 89
See application file for complete search history.

(56) References Cited

U.S. PATENT DOCUMENTS

| | | | | |
|---|---|---|---|---|
| 5,393,838 A | * | 2/1995 | Moczygemba et al. | 525/98 |
| 5,705,569 A | * | 1/1998 | Moczygemba et al. | 525/314 |
| 5,910,546 A | | 6/1999 | Trepka et al. | |

FOREIGN PATENT DOCUMENTS

| | | |
|---|---|---|
| EP | 0 492 490 A2 | 7/1992 |
| EP | 0 646 607 A2 | 4/1995 |
| JP | 53-60950 | 5/1978 |
| JP | 59-30850 | 2/1984 |
| JP | 62-174250 | 7/1987 |
| JP | 62-232418 | 10/1987 |
| JP | 2-269129 | 11/1990 |
| JP | 11-255851 | 9/1999 |
| JP | 2000-26698 | 1/2000 |
| WO | WO 02/02693 A1 | 1/2002 |

OTHER PUBLICATIONS

U.S. Appl. No. 10/566,372, filed Jan. 30, 2006, Watanabe, et al.
Office Action issued Sep. 14, 2010, in Japanese Patent Application No. 2005-504019 (with English-language Translation).

* cited by examiner

*Primary Examiner* — Jeffrey C Mullis
(74) *Attorney, Agent, or Firm* — Oblon, Spivak, McClelland, Maier & Neustadt, L.L.P.

(57) ABSTRACT

To provide a block copolymer composition excellent in balance of transparency, impact resistance, etc. in the form of not only an excluded product and a blow molded product but also an injection molded product.

A linear block copolymer composition having at least three types of polymer blocks with different molecular weights each comprising a vinyl aromatic hydrocarbon as monomer units, wherein the molecular weight distribution of a mixture of the polymer blocks is within a specific range, and in GPC of the mixture, M1/M2 is within a specific range, where M1 is the peak top molecular weight corresponding to a peak at which the peak top molecular weight becomes maximum among peaks forming a proportion of the area of at least 30% to the whole peak area, and M2 is the peak top molecular weight corresponding to a peak at which the peak top molecular weight becomes minimum among peaks at which the peak top molecular weight is at most 50,000 and which form a proportion of the area of at least 20% to the whole peak area.

22 Claims, 1 Drawing Sheet

LINEAR BLOCK COPOLYMER COMPOSITION

TECHNICAL FIELD

The present invention relates to a novel linear block copolymer composition comprising a vinyl aromatic hydrocarbon and a conjugated diene. Particularly, it relates to a linear block copolymer composition excellent in transparency and impact resistance and useful as it is or as a blending agent with various thermoplastic resins.

BACKGROUND ART

A block copolymer comprising a vinyl aromatic hydrocarbon and a conjugated diene and having a relatively high content of the vinyl aromatic hydrocarbon is widely used for an application to injection molding or for an application to extrusion, such as sheets and films, by virtue of its excellent characteristics such as transparency and impact resistance. Particularly, some such block copolymers and styrene polymer compositions having such a block copolymer blended therewith, which are excellent in transparency, impact resistance, etc., have been proposed.

For example, JP-A-52-78260 discloses a linear copolymer composition wherein the molecular weight distribution at a vinyl aromatic hydrocarbon block moiety is from 2.3 to 4.5 and a branched block copolymer composition wherein the molecular weight distribution at a vinyl aromatic hydrocarbon block moiety is from 2.8 to 3.5, which is produced by blending. JP-B-2-59164 discloses a linear block copolymer and a branched block copolymer, wherein the molecular weight distribution at a vinyl-substituted aromatic hydrocarbon block moiety is from 1.2 to 2.0. JP-A-53-286 discloses a branched block copolymer wherein the ratio of the number average molecular weight of a high molecular weight component to a low molecular weight component at a vinyl-substituted aromatic hydrocarbon block moiety in two linear copolymers prior to coupling is from 3 to 7, and its production process. JP-A-7-173232 discloses a branched block copolymer having at least three polymer blocks each comprising a vinyl aromatic hydrocarbon as monomer units, and its production process. Further, JP-A-57-28150 discloses a method of combining a branched block copolymer wherein the molecular weight distribution at a vinyl aromatic hydrocarbon block moiety is out of the range of from 2.8 to 3.5.

However, such block copolymers and compositions of such a block copolymer with a thermoplastic resin formed by the above methods are poor in balance of transparency, impact resistance, etc. Particularly in injection molding, molding is carried out under a high shearing force, whereby a molded product is likely to have anisotropy and tends to be poor in strength in a certain direction, and a sufficient molded product can hardly be provided.

DISCLOSURE OF THE INVENTION

Under these circumstances, the present inventors have conducted extensive studies to obtain a block copolymer composition excellent in balance of transparency, impact resistance, etc. in the form of not only an extruded product and a blow molded product but also an injection molded product and as a result, found that the impact resistance is extremely improved without deteriorating transparency even in the form of an injection molded product by use of a linear block copolymer composition comprising at least three polymer blocks with different molecular weights, each comprising a vinyl aromatic hydrocarbon as monomer units, wherein the molecular weight distribution of a mixture of the polymer blocks is within a specific range, and in a gel permeation chromatogram of the mixture of the polymer blocks, M1/M2 is within a specific range, where M1 is the peak top molecular weight corresponding to a peak at which the peak top molecular weight becomes maximum among peaks forming a proportion of the area of at least 30% to the whole peak area, and M2 is the peak top molecular weight corresponding to a peak at which the peak top molecular weight becomes minimum among peaks at which the peak top molecular weight is at most 50,000 and which form a proportion of the area of at least 20% to the whole peak area. The present invention has been accomplished on the basis of this discovery.

Namely, the present invention relates to a composition of a linear block copolymer comprising from 55 to 95 mass % of a vinyl aromatic hydrocarbon and from 5 to 45 mass % of a conjugated diene as monomer units based on the total mass of the copolymer, characterized in that the linear block copolymer is a mixture of a linear block copolymer having at least three polymer blocks with different molecular weights, each comprising a vinyl aromatic hydrocarbon as monomer units and represented by the following formula:

(wherein S is a polymer block comprising a vinyl aromatic hydrocarbon as monomer units, and B is a polymer block comprising a conjugated diene as monomer units) and further, (1) the molecular weight distribution of a mixture of the polymer blocks each comprising a vinyl aromatic hydrocarbon as monomer units, is within a range of from 3.35 to 6, and (2) in a gel permeation chromatogram of a mixture of the polymer blocks each comprising a vinyl aromatic hydrocarbon as monomer units, M1/M2 is within a range of from 12.5 to 25, where M1 is the peak top molecular weight corresponding to a peak at which the peak top molecular weight becomes maximum among peaks forming a proportion of the area of at least 30% to the whole peak area, and M2 is the peak top molecular weight corresponding to a peak at which the peak top molecular weight becomes minimum among peaks at which the peak top molecular weight is at most 50,000 and which form a proportion of the area of at least 20% to the whole peak area.

BRIEF DESCRIPTION OF THE DRAWINGS

In FIG. 1, *1 and *2 are as follows. *1: a peak at which the peak top molecular weight becomes maximum among peaks forming a proportion of the area of at least 30% to the whole peak. *2: a peak at which the peak top molecular weight becomes minimum among peaks forming a proportion of the area of at least 15% to the whole peak area.

In FIG. 2, S1, S2 and *3 are as follows. S1: a peak at which the peak top molecular weight becomes maximum among peaks forming a proportion of the area of at least 30% to the whole peak area. S2: a peak at which the peak top molecular weight is at most 50,000 and which forms a proportion of the area of at least 20% to the whole peak are. *3: a peak forming a proportion of the area of from 3 to 15% to the whole peak area among peaks at which the peak top molecular weight is from 13,000 to 50,000.

BEST MODE FOR CARRYING OUT THE INVENTION

Figure 1:
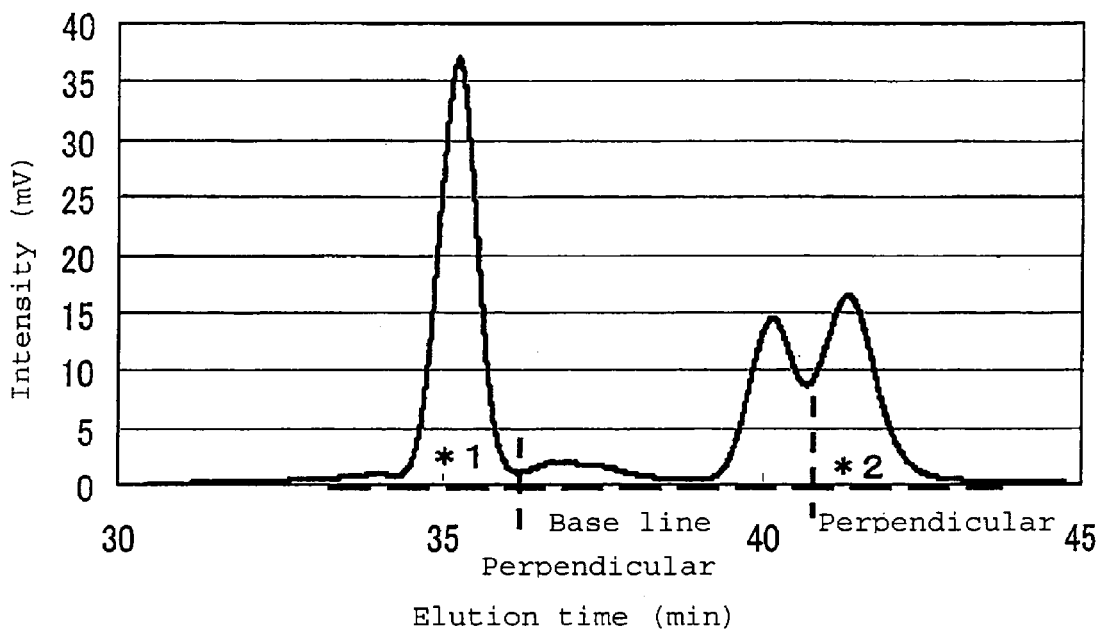
FIG. 1 is a chromatogram obtained by measuring a linear block copolymer composition under measurement conditions 2.

Now, the present invention will be explained in detail below.

The vinyl aromatic hydrocarbon used for the linear block copolymer composition of the present invention may, for example, be styrene, o-methylstyrene, p-methylstyrene, p-tert-butylstyrene, 1,3-dimethylstyrene, α-methylstyrene, vinylnaphthalene or vinylanthracene, and styrene is particularly commonly mentioned. They may be used alone or as a mixture of two or more of them.

The conjugated diene is a diolefin having 4 or 8 carbon atoms and having a pair of conjugated double bonds, and it may, for example, be 1,3-butadiene, 2-methyl-1,3-butadiene (isoprene), 2,3-dimethyl-1,3-butadiene, 1,3-pentadiene or 1,3-hexadiene. 1,3-Butadiene or isoprene is particularly commonly mentioned. They may be used alone or as a mixture of two or more of them.

The linear block copolymer composition of the present invention comprises from 55 to 95 mass % of a vinyl aromatic hydrocarbon and from 5 to 45 mass % of a conjugated diene as monomer units, based on the total mass of the polymer. If the linear block copolymer composition comprises a vinyl aromatic hydrocarbon in an amount exceeding 95 mass % and a conjugated diene in an amount less than 5 mass % as monomer units, it tends to be poor in impact resistance. On the other hand, if the linear block copolymer composition comprises a vinyl aromatic hydrocarbon in an amount less than 55 mass % and a conjugated diene in an amount exceeding 45 mass % as monomer units, it tends to be poor in transparency, moldability, rigidity, heat stability, etc.

The linear block copolymer composition preferably comprises from 60 to 85 mass % of a vinyl aromatic hydrocarbon and from 15 to 40 mass % of a conjugated diene as monomer units, based on the total mass of the polymer, whereby it tends to have more favorable balance of impact resistance and transparency. Further, the linear block copolymer composition more preferably comprises from 65 to 75 mass % of a vinyl aromatic hydrocarbon and from 25 to 35 mass % of a conjugated diene as monomer units, whereby it tends to have furthermore favorable balance of physical properties such as impact resistance, transparency and moldability.

The linear block copolymer contained in the linear block copolymer composition of the present invention is a mixture of a linear block copolymer having at least three polymer blocks with different molecular weights, each comprising a vinyl aromatic hydrocarbon as monomer units, represented by the following formula:

S—B—S (wherein S is a polymer block comprising a vinyl aromatic hydrocarbon as monomer units, and B is a polymer block comprising a conjugated diene as monomer units).

Namely, the linear block copolymer composition comprises at least 3 types, preferably from 3 to 6 types, more preferably 3 types, of polymer blocks each comprising a vinyl aromatic hydrocarbon as monomer units, whereby the linear block copolymer composition of the present invention is very excellent in balance of physical properties such as impact resistance, transparency and moldability.

Further, as it comprises at least 3 types, preferably from 3 to 6 types, more preferably 3 types, of the polymer blocks, it has a favorable compatibility with a styrene resin such as a polystyrene, and accordingly a resin composition obtained by mixing such a block copolymer composition with a styrene resin tends to have favorable balance of physical properties such as impact resistance, transparency and moldability. As mentioned above, it is essential that the linear block copolymer composition of the present invention comprises at least three polymer blocks each comprising a vinyl aromatic hydrocarbon as monomer units.

Further, it is essential that the molecular weight distribution of a mixture of the polymer blocks each comprising a vinyl aromatic hydrocarbon as monomer units is within a range of from 3.35 to 6. When the molecular weight distribution of the polymer block mixture is within this range, the compatibility of the polymer block mixture with a styrene resin such as a polystyrene will be favorable, whereby a resin composition obtained by mixing such a linear block copolymer composition with a styrene resin tends to have very excellent impact resistance and transparency. If the molecular weight distribution of such a polymer block mixture is out of the range of from 3.35 to 6, a resin composition obtained by mixing such a linear block copolymer composition with a styrene resin tends to have insufficient impact resistance and transparency, and tends to be poor in moldability.

Among the linear block copolymer compositions of the present invention wherein the molecular weight distribution of the polymer block mixture is within a range of from 3.35 to 6, a linear block copolymer composition wherein the molecular weight distribution is within a range of from 3.35 to 4.5 is more excellent in balance between transparency such as a total luminous transmittance or a haze and an area impact property as evaluated by a falling weight test or the like, as characteristics of the linear block copolymer composition as it is or a resin composition obtained by mixing such a linear block copolymer composition with a styrene resin. On the other hand, a linear block copolymer composition wherein the molecular weight distribution is within a range of from 4.5 to 6 is slightly poor in transparency such as a total luminous transmittance or a haze, but is very excellent in notched impact resistance as evaluated by a Charpy impact test or the like, as characteristics of the linear block copolymer composition as it is or a resin composition obtained by mixing such a linear block copolymer composition with a styrene resin. If the molecular weight distribution is less than 3.35, the linear block copolymer composition as it is or a resin composition obtained by mixing such a block copolymer composition with a styrene resin tends to be poor in impact resistance, and if it exceeds 6, a resin composition obtained by mixing such a block copolymer composition with a styrene resin tends to be poor in transparency. As mentioned above, the present invention is characterized in that materials having various characteristics can be obtained by properly controlling the molecular weight distribution of the polymer block mixture within a range of from 3.35 to 6.

Within the range of the molecular weight distribution of from 3.35 to 4.5 within which the linear block copolymer composition will be more excellent in balance between transparency and impact resistance, the molecular weight distribution is more preferably within a range of from 3.5 to 4.5, furthermore preferably from 3.5 to 4. On the other hand, within the range of the molecular weight distribution of from 4.5 to 6 within which the linear block copolymer composition will be very excellent in notched impact resistance, the molecular weight distribution is more preferably within a range of from 4.5 to 5.5, furthermore preferably from 4.5 to 5.

In order to batch off a mixture of polymer blocks S1, S2 and S3, each comprising a vinyl aromatic hydrocarbon as monomer units, a method may be employed wherein a block copolymer mixture containing the linear block copolymer is subjected to ozonolysis and then reduction with lithium aluminum hydride, and the resulting polymer content is obtained, as disclosed in Polymer, vol. 22, 1721 (1981), Rubber Chemistry and Technology, vol. 59, 16 (1986), Macromolecules, vol. 16, 1925 (1983), etc.

As conditions for measuring the polymer block mixture thus batched off by gel permeation chromatography (GPC), a GPC column with a number of theoretical plate of at least 32,000 is used.

More specifically, the following measurement conditions 1 may be mentioned.

[Measurement Conditions 1]

Solvent (mobile phase): THF

Flow rate: 1.0 ml/min

Preset temperature: 40° C.

Column structure: One column of TSK guardcolumn MP (xL) 6.0 mmID×4.0 cm manufactured by TOSOH CORPORATION and two columns of TSK-GEL MULTIPORE HXL-M 7.8 mmID×30.0 cm (number of theoretical plate: 16,000) manufactured by TOSOH CORPORATION, a total of three columns in the order of TSK guardcolumn MP (xL), TSK-GEL MULTIPORE HXL-M and TSK-GEL MULTIPORE HXL-M (number of theoretical plate: 32,000 as a whole)

Sample injection amount: 100 μL (sample liquid concentration 1 mg/ml)

Column pressure: 39 kg/cm$^2$

Detector: RI detector

Further, it is essential for the linear block copolymer composition of the present invention that in a gel permeation chromatogram of the mixture of the polymer blocks each comprising a vinyl aromatic hydrocarbon as monomer units, M1/M2 is within a range of from 12.5 to 25, where M1 is the peak top molecular weight corresponding to a peak at which the peak top molecular weight becomes maximum among peaks forming a proportion of the area of at least 30% to the whole peak area, and M2 is the peak top molecular weight corresponding to a peak at which the peak top molecular weight becomes minimum among peaks at which the peak top molecular weight is at most 50,000 and which form a proportion of the area of at least 20% to the whole peak area. When M1/M2 is within a range of from 12.5 to 25, the linear block copolymer composition and a mixed resin composition comprising it and a styrene resin tend to have more improved impact resistance. M1/M2 is more preferably within a range of from 12.7 to 21.5, furthermore preferably from 13 to 20.

If M1/M2 is less than 12.5, the linear block copolymer composition as it is or a resin composition obtained by mixing such a linear block copolymer composition with a styrene resin tends to be poor in impact resistance, and if it exceeds 25, a resin composition obtained by mixing such a block copolymer composition with a styrene resin tends to be poor in transparency.

Further, in a gel permeation chromatogram of the mixture of the polymer blocks each comprising a vinyl aromatic hydrocarbon as monomer units, when M5/M2 is within a range of from 2 to 4, where M5 is the peak top molecular weight of a component forming a proportion of the area of from 3 to 15% to the whole peak area among peaks at which peak top molecular weight is from 13,000 to 50,000, the linear block copolymer composition and a mixed resin composition comprising it and a styrene resin tend to have more improved impact resistance. M5/M2 is more preferably within a range of from 2.2 to 3.6. If M5/M2 is less than 2, the linear block copolymer composition as it is or a resin composition obtained by mixing such a linear block copolymer composition with a styrene resin may be poor in transparency in some cases, and if it exceeds 4, a resin composition obtained by mixing such a block copolymer composition with a styrene resin may be poor in impact resistance in some cases.

The above peak top molecular weights M1, M2 and M5 can be obtained by means of GPC as follows. Namely, the peak top molecular weight of each peak component in the polymer block mixture can be obtained by calculation in accordance with a known method (such as "Gel Permeation Chromatography", p. 81 to 85 (1976, published by Maruzen Company, Limited, Japan)) using a GPC curve prepared by subjecting the mixture of the polymer blocks each comprising a vinyl aromatic hydrocarbon as monomer units to GPC and a calibration curve prepared from the peak count and the molecular weight obtained by subjecting a monodispersed polystyrene to GPC. Employing the proportion of the area of each peak, among peaks forming a proportion of the area of at least 30% to the whole peak area, a peak at which the peak top molecular weight becomes maximum is selected to obtain the peak top molecular weight M1 of a component to which the peak is attributable, and among peaks at which the peak top molecular weight is at most 50,000 and which form a proportion of the area of at least 20% to the whole peak area, a peak at which the peak top molecular weight becomes minimum is selected to obtain the peak top molecular weight M2 of a component to which the peak is attributable. Further, among peaks at which the peak top molecular weight is from 13,000 to 50,000, a peak forming a proportion of the area of from 3 to 15% to the whole peak area is selected to obtain the peak top molecular weight M5 of a component to which the peak is attributable. As measurement conditions of the polymer block mixture by GPC, it is preferred to use a GPC column with a number of theoretical plate of at least 32,000.

More specifically, the measurement conditions 1 are employed, as explained above for determination of the molecular weight distribution of the mixture of the polymer blocks each comprising a vinyl aromatic hydrocarbon as monomer units.

In the gel permeation chromatogram of the mixture of the polymer blocks each comprising a vinyl aromatic hydrocarbon as monomer units, when the proportion of the number of moles of S1 to the sum of the numbers of moles of S1 and S2 is preferably within a range of from 5 to 25 mol %, where S1 is a component corresponding to a peak at which the peak top molecular weight becomes maximum among peaks forming a proportion of the area of at least 30% to the whole peak area, and S2 is a component corresponding to a peak at which the peak top molecular weight becomes minimum among peaks at which the peak top molecular weight is at most 50,000 and which form a proportion of the area of at least 20% to the whole peak area, the linear block copolymer composition and a mixed resin composition comprising it and a styrene resin tend to have a favorable balance of impact resistance, transparency and moldability. The proportion of the number of moles of S1 to the sum of the numbers of moles of S1 and S2 is particularly preferably within a range of from 6 to 20 mol %, furthermore preferably from 6.5 to 17 mol %. If the proportion of the number of moles of S1 to the sum of the numbers of moles of S1 and S2 is less than 5 mol %, the linear block copolymer composition and a mixed resin composition comprising it and a styrene resin tend to be poor in transparency, and if the proportion of the number of moles of S1 to the sum of the numbers of moles of S1 and S2 exceeds 25 mol %, the linear block copolymer composition and a mixed resin composition comprising it and a styrene resin tend to be poor in impact resistance.

The molar ratio of S1 and S2 can be calculated, in the present invention for example, as molar fractions from the values of M1 and M2 and the values of areas of the corresponding peaks on a chromatogram of a mixture of S1 and S2 by GPC.

Further, in view of balance of impact resistance, transparency and moldability of the linear block copolymer composition, in the gel permeation chromatogram of the mixture of the polymer blocks each comprising a vinyl aromatic hydrocarbon as monomer units, the peak top molecular weight corresponding to a peak at which the peak top molecular weight becomes maximum among peaks forming a proportion of the area of at least 30% to the whole peak area is preferably from 90,000 to 200,000, and the peak top molecular weight corresponding to a peak at which the peak top molecular weight becomes minimum among peaks at which the peak top molecular weight is at most 50,000 and which form a proportion of the area of at least 20% to the whole peak area is preferably from 4,500 to 20,000.

Further, it is more preferred that the peak top molecular weight corresponding to a peak at which the peak top molecular weight becomes maximum among peaks forming a proportion of the area of at least 30% to the whole peak area is from 100,000 to 170,000, and the peak top molecular weight corresponding to a peak at which the peak top molecular weight becomes minimum among peaks at which the peak top molecular weight is at most 50,000 and which form a proportion of the area of at least 20% to the whole peak area is from 5,000 to 10,000.

Further, the peak top molecular weight corresponding to a peak forming a proportion of the area of from 3 to 15% to the whole peak area among peaks at which the peak top molecular weight is from 13,000 to 50,000 is preferably from 14,000 to 25,000 in view of balance of impact resistance, transparency and moldability of the linear block copolymer composition, and the peak top molecular weight is more preferably from 16,000 to 23,000.

In the linear block copolymer composition of the present invention, the molecular weight distribution of the component corresponding to a peak at which the peak top molecular weight becomes maximum among peaks forming a proportion of the area of at least 30% to the whole peak area is preferably less than 1.03, whereby a mixture containing such a linear block copolymer composition tends to have more improved impact resistance, particularly area impact property. The molecular weight distribution of the component corresponding to a peak at which the peak top molecular weight becomes maximum among peaks forming a proportion of the area of at least 30% to the whole peak area is more preferably within a range of from 1.005 to 1.025.

The proportion of the area of the above peak to the whole peak area is obtained preferably by measurement using a GPC column with a number of theoretical plate of at least 100,000 using a gel permeation chromatograph prepared by measuring the linear block copolymer composition of the present invention by GPC and a calibration curve prepared by using a commercial standard polystyrene for GPC. More specifically, the following measurement conditions 2 may be mentioned,

[Measurement Conditions 2]
Solvent (mobile phase): THF
Flow rate: 0.2 ml/min
Preset temperature: 40° C.
Column structure: One column of KF-G 4.6 mmID×10 cm manufactured by SHOWA DENKO K.K. and four columns of KF-404HQ 4.6 mmID×25.0 cm (number of theoretical plate: 25,000) manufactured by SHOWA DENKO K.K., a total of five columns in the order of KF-G, KF-404HQ, KF-404HQ, KF-404-HQ and KF-404HQ (number of theoretical plate: 100,000 as a whole)
Sample injection amount: 10 μL (sample liquid concentration 2 mg/ml)
Column pressure: 127 kg/cm$^2$
Detector: RI detector Further, in the linear block copolymer composition of the present invention, M3/M4 is preferably within a range of from 2.5 to 4.5, where M3 is the peak top molecular weight corresponding to a peak at which the peak top molecular weight becomes maximum among peaks forming a proportion of the area of at least 30% to the whole peak area, and M4 is the peak top molecular weight corresponding to a peak at which the peak top molecular weight becomes minimum among peaks forming a proportion of the area of least 15% to the whole peak area. When M3/M4 is within a range of from 2.5 to 4.5, a mixed resin composition comprising such a linear block copolymer composition and a styrene resin tends to have more improved impact resistance. M3/M4 is particularly preferably within a range of from 2.9 to 4. If M3/M4 is less than 2.5, the linear block copolymer composition and a mixed resin composition comprising it and a styrene resin tend to be poor in impact resistance, and if it exceeds 4.5, the linear block copolymer composition and a mixed resin composition comprising it and a styrene resin tend to be poor in transparency.

The peak top molecular weight M3 is determined by selecting a component corresponding to a peak at which the peak top molecular weight becomes maximum among peaks forming a proportion of the area of at least 30% to the whole peak area, and obtaining the peak top molecular weight of such a component.

Similarly, the peak top molecular weight M4 is determined by selecting a component corresponding to a peak at which the peak top molecular weight becomes minimum among peaks forming a proportion of the area of at least 15% to the whole peak area, and obtaining the peak top molecular weight of such a component.

The peak top molecular weight of the linear block copolymer composition comprising a polymer block comprising a vinyl aromatic hydrocarbon as monomer units and a polymer block comprising a conjugated diene as monomer units can also be determined by GPC under the same conditions for the above-explained determination of the molecular weight distribution of a component corresponding to a peak at which the peak top molecular weight becomes maximum among peaks forming a proportion of the area of at least 30% to the whole peak area. Namely, M3 and M4 are values as calculated as PS. Further, as a specific example of conditions for measuring the copolymer by GPC, the above-described measurement conditions 2 may be mentioned.

In the linear block copolymer composition of the present invention, the peak top molecular weight of a component providing a maximum peak area in a gel permeation chromatogram is preferably within a range of from 120,000 to 250,000, more preferably from 140,000 to 220,000, furthermore preferably from 150,000 to 200,000. Particularly when the peak top molecular weight of a component providing a maximum peak area in a gel permeation chromatogram is less than 120,000, the linear block copolymer composition and a mixed resin composition comprising it and a styrene resin tend to be poor in impact resistance, transparency and moldability, and if it exceeds 250,000, the linear block copolymer composition and a mixed resin composition comprising it and a styrene resin tend to be poor in transparency and moldability.

In order to obtain a gel permeation chromatogram of the linear block copolymer composition, it is preferred to use a GPC column with a number of theoretical plate of at least 100,000. More specifically, the above-described measurement conditions 2 may be mentioned.

As an organic solvent to be used for production of the linear block copolymer composition of the present invention, a known organic solvent such as an aliphatic hydrocarbon such as butane, pentane, hexane, isopentane, heptane, octane or isooctane, an alicyclic hydrocarbon such as cyclopentane, methylcyclopentane, cyclohexane, methylcyclohexane or ethylcyclohexane, or an aromatic hydrocarbon such as benzene, toluene, ethylbenzene or xylene may be used.

Further, an organic lithium compound is a compound having at least one lithium atom bonded to its molecule, and for example, ethyllithium, n-propyllithium, isopropyllithium, n-butyllithium, sec-butyllithium or t-butyllithium may be used.

In production of the linear block copolymer composition of the present invention, a small amount of a polar compound may be dissolved in a solvent. The polar compound is used to improve efficiency of an initiator, to adjust the microstructure of a conjugated diene, or as a randomizing agent in a case where a vinyl aromatic hydrocarbon and a conjugated diene are copolymerized. The polar compound to be used for production of the linear block copolymer composition of the present invention may, for example, be an ether such as tetrahydrofuran, diethylene glycol dimethyl ether or diethylene glycol dibutyl ether, an amine such as triethylamine or tetramethylethylenediamine, a thioether, a phosphine, a phosphoramide, an alkylbenzene sulfonate, or an alkoxide of potassium or sodium. A preferred polar compound is tetrahydrofuran.

The polymerization temperature in production of the linear block copolymer composition of the present invention is usually from −10° C. to 150° C., preferably from 40° C. to 120° C. The time required for polymerization varies depending upon the conditions, but is usually within 48 hours, particularly preferably from 0.5 to 10 hours. Further, the atmosphere in the polymerization system is preferably replaced with an inert gas such as a nitrogen gas. The polymerization pressure is not particularly limited so long as the polymerization is carried out under a pressure sufficient to maintain monomers and a solvent in a liquid phase within the above polymerization temperature range. Further, it is necessary to pay attention not to incorporate impurities which inactivate an initiator and a living polymer, such as water, oxygen or carbon dioxide gas into the polymerization system.

After completion of the polymerization, a substance having active hydrogen such as water, an alcohol, carbon dioxide, an organic acid or an inorganic acid as a polymerization terminator is added for inactivation in an amount sufficient to inactivate active terminals. At this time, when water or an alcohol is used as the polymerization terminator for example, hydrogen is introduced to a polymer chain terminal, and when carbon dioxide is used, a carboxyl group is introduced. Accordingly, by appropriately selecting the polymerization terminator, linear block copolymer compositions containing block copolymer components having various functional groups on their terminals can be produced.

The mixture of a linear block copolymer having at least 3 types of blocks each comprising a vinyl aromatic hydrocarbon as monomer units, represented by the following formula:

of the present invention can be obtained, for example, by the following method (1), (2) or (3).

(1) It can be obtained by blending linear block copolymers of the above formula produced by a conventional living anionic polymerization method using an organic lithium compound as an initiator in a hydrocarbon solvent within a range as defined in the present invention. Otherwise, it can be obtained by the following methods.

(2) First, a vinyl aromatic hydrocarbon is subjected to anionic polymerization using an initiator, and then successive addition of an initiator and a vinyl aromatic hydrocarbon to the polymerization system is carried out twice, to form a polymer block comprising three types of vinyl aromatic hydrocarbons with different peak top molecular weights as monomer units. Then, a conjugated diene is added and further, successive addition of a vinyl aromatic hydrocarbon is carried out, and then all active terminals of the polymer are inactivated to obtain a polymer within a range as defined in the present invention.

(3) First, a vinyl aromatic hydrocarbon is subjected to anionic polymerization using an initiator, and then successive addition of an initiator and a vinyl aromatic hydrocarbon to the polymerization system is carried out twice, to form a polymer block comprising three types of vinyl aromatic hydrocarbons with different peak top molecular weights as monomer units. Then, a conjugated diene is added and further, successive addition of a vinyl aromatic hydrocarbon is carried out, and then part of active terminals of the polymer are inactivated, the polymerization is continued, and then a vinyl aromatic hydrocarbon is further added, to obtain a polymer within a range as defined in the present invention.

Now, a method for producing the linear block copolymer composition by the above method (2) or (3) will be explained in further detail below.

As a first stage polymerization, a block comprising a vinyl aromatic hydrocarbon as monomer units is polymerized. For this polymerization, a charge amount is determined so as to obtain an aimed molecular weight, and then a vinyl aromatic hydrocarbon, an organic lithium compound initiator, a solvent and as the case requires, a polar compound are dissolved, and the polymerization is carried out at a predetermined temperature. The amount of the solvent charged is, as the ratio of the charge amount of the solvent to the total monomer amount, is preferably such that the solvent/total monomer amount is from 20/1 to 2/1 (weight ratio), more preferably from 10/1 to 2.5/1 (weight ratio). If the solvent/total monomer amount is at least 20/1, the productivity tends to be poor, and if the solvent/total monomer amount is at most 2/1, the viscosity of the polymer liquid tends to increase, which may impair the reaction. As the ratio of charge amount of the solvent to the polar compound, the polar compound/solvent is preferably from 1/100,000 to 1/1,000 (weight ratio), more preferably from 1/10,000 to 1/3,333 (weight ratio). If the polar compound/solvent is less than 1/100,000, the efficiency of the initiator tends to be poor, and if the polar compound/solvent exceeds 1/1,000, the microstructure of the conjugated diene may be impaired, whereby the impact resistance tends to be poor.

As the ratio of the charge amount of the first stage organic lithium compound initiator to the total monomer amount, the first stage organic lithium compound initiator/total monomer amount is preferably from 1/4,000 to 1/6,000 (weight ratio), more preferably from 1/4,400 to 1/5,600 (weight ratio). As the ratio of the total monomer amount to the charge amount of the first stage vinyl aromatic hydrocarbon, the total monomer amount/first stage vinyl aromatic hydrocarbon is preferably from 2/1 to 4/1 (weight ratio), more preferably from 2.5/1 to 3.5/1 (weight ratio). Further, as the ratio of the total organic lithium compound initiator amount to the charge amount of the first stage organic lithium compound initiator, the total organic lithium compound initiator/first stage organic lithium compound initiator is preferably from 3 to 10 (molar ratio), more preferably from 4 to 7 (molar ratio). Complete completion of the first stage polymerization reaction is taken as the end point of the polymerization. It is preferred that after completion of the first stage polymerization reaction, predetermined amounts of an organic lithium compound initiator and a vinyl aromatic hydrocarbon are newly added to the polymerization system to initiate a second stage polymerization. The end point of the polymerization can be judged by measuring the solid content concentration in a sampled polymer liquid to confirm whether or not a polymer at a predetermined concentration is formed. Otherwise, it may be judged by confirming that substantially no unreacted monomer remains by e.g. gas chromatography.

With respect to the amounts of the organic lithium compound initiator and the vinyl aromatic hydrocarbon added for the second stage polymerization, their charge amounts are determined to obtain aimed molecular weights with respect to a polymer chain continuously prepared from living polymer active terminals formed in the first stage polymerization and a polymer chain prepared from the organic lithium compound initiator newly added at the completion of the first stage polymerization.

As the ratio of the charge amount of the second stage organic lithium compound initiator to the total monomer amount, the second stage organic lithium compound initiator/total monomer amount is preferably from 1/1,400 to 1/11,000 (weight ratio), more preferably from 1/2,500 to 1/9,000 (weight ratio). As the ratio of the total organic lithium compound initiator amount to the charge amount of the second organic lithium compound initiator, the organic lithium compound initiator/second stage organic lithium compound initiator is preferably from 1.5/1 to 12/1 (molar ratio), more preferably from 2.5/1 to 10.5/1 (molar ratio).

Further, as the ratio of the total monomer amount to the charge amount of the second vinyl aromatic hydrocarbon, the total monomer amount/second stage vinyl aromatic hydrocarbon is preferably from 9.5/1 to 25/1 (weight ratio), more preferably from 11/1 to 24/1 (weight ratio). The vinyl aromatic hydrocarbon is added and polymerization is continued at a predetermined temperature, and complete completion of the polymerization reaction is taken as the end point of the second stage polymerization. It is preferred that after completion of the second stage polymerization, predetermined amounts of an organic lithium compound initiator and a vinyl aromatic hydrocarbon are newly added to the polymerization system to initiate a third stage polymerization. The end point of the polymerization can be judged by measuring the solid content concentration in a sampled polymer liquid to confirm whether or not a polymer at a predetermined concentration is formed. Otherwise, it may be judged by confirming that substantially no unreacted monomer remains by e.g. gas chromatography.

With respect to the amounts of the organic lithium compound initiator and the vinyl aromatic hydrocarbon added in the third stage polymerization, their charge amounts are determined to obtain aimed molecular weights with respect to a polymer chain prepared continuously from the living polymer active terminals formed in the first and second stage polymerization and a polymer chain prepared from the organic lithium compound initiator newly added at the completion of the second stage polymerization. As the ratio of the charge amount of the third stage organic lithium compound initiator to the total monomer amount, the third stage organic lithium compound initiator/total monomer amount is preferably from 1/1,000 to 1/5,500 (weight ratio), more preferably from 1/1,000 to 1/2,000 (weight ratio), furthermore preferably from 1/1,300 to 1/1,900. As the ratio of the total organic lithium compound initiator amount to the charge amount of the third stage organic lithium compound initiator, the total organic lithium compound initiator/third stage organic lithium compound initiator is preferably from 1.05/1 to 6/1 (molar ratio), more preferably from 1.3/1 to 2.1/1 (molar ratio). Further, as the ratio of the total monomer amount to the charge amount of the third stage vinyl aromatic hydrocarbon, the total monomer amount/third stage vinyl aromatic hydrocarbon is preferably from 6/1 to 10/1 (weight ratio), more preferably from 7/1 to 9/1 (weight ratio).

After the vinyl aromatic hydrocarbon is added and polymerization is continued at a predetermined temperature, complete completion of the polymerization reaction is taken as the end point of the third stage polymerization. It is preferred that after completion of the third stage polymerization, a predetermined amount of a conjugated diene is newly added to the polymerization system to initiate a fourth stage polymerization. The end point of the polymerization can be judged by measuring the solid content concentration of a sampled polymer liquid to confirm whether or not a polymer at a predetermined concentration is formed. Otherwise, it may be judged by confirming that substantially no unreacted monomer remains by e.g. gas chromatography.

In the fourth stage polymerization, the charge amount is determined to obtain an aimed molecular weight and then a conjugated diene is added. As the ratio of the charge amount of the conjugated diene to the total monomer amount, the conjugated diene/total monomer amount is preferably from 2.5/1 to 5/1 (weight ratio), more preferably from 2.9/1 to 4/1 (weight ratio). After the conjugated diene is added and polymerization is continued at a predetermined temperature, the complete completion of the polymerization reaction is taken as the end point of the fourth stage polymerization. The end point of the polymerization can be judged by measuring the solid content concentration of a sampled polymer liquid to confirm whether or not a polymer at a predetermined concentration is formed.

In a fifth stage polymerization, the charge amount is determined to obtain an aimed molecular weight and then a vinyl aromatic hydrocarbon is added. As the ratio of the total monomer amount to the charge amount of the fifth stage vinyl aromatic hydrocarbon, the total monomer amount/fifth stage vinyl aromatic hydrocarbon is preferably from 6/1 to 10/1 (weight ratio), more preferably from 7/1 to 9/1 (weight ratio). After the vinyl aromatic hydrocarbon is added and polymerization is continued at a predetermined temperature, complete completion of the polymerization reaction is taken as the end point of the fifth stage polymerization. Then, all active terminals in an active polymer chain may be inactivated by a polymerization terminator such as water or an alcohol in an amount sufficient to inactivate all active terminals, or only part of active terminals may be inactivated by addition of a polymerization terminator such as water or an alcohol and as the case requires, a solvent, in an amount to inactivate only part of active terminals so that living anionic polymerization is continued, and then a sixth stage polymerization is carried out. As the number of remaining active terminals at the sixth stage polymerization, the number of active terminals at the fifth stage polymerization/number of active terminals at the sixth stage polymerization is preferably from 1.05 to 2.5, more preferably from 1.1 to 2. The end point of the polymerization can be judged by measuring the solid content concentration of a sampled polymer liquid to confirm whether or not a polymer at a predetermined concentration is formed. Otherwise, it may be judged by confirming that substantially no unreacted monomer remains by e.g. gas chromatography.

When only part of active terminals are inactivated and the living anionic polymerization is continued, the sixth stage polymerization is carried out. In the sixth stage polymerization, the charge amount is determined to obtain an aimed molecular weight and then a vinyl aromatic hydrocarbon is added. As the ratio of the total monomer amount to the charge amount of the sixth stage vinyl aromatic hydrocarbon, the total monomer amount/sixth stage vinyl aromatic hydrocarbon is preferably from 10/1 to 30/1 (weight ratio), more preferably from 14/1 to 25/1 (weight ratio). After a vinyl aromatic hydrocarbon is added and polymerization is continued at a predetermined temperature, complete completion of the polymerization reaction is taken as the end point of the sixth stage polymerization. The end point of the polymerization can be judged by measuring the solid content concentration of a sampled polymer liquid to confirm whether or not a polymer at a predetermined concentration is formed. Otherwise, it may be judged by confirming that substantially no unreacted monomer remains by e.g. gas chromatography. After completion of the sixth stage polymerization, it is preferred to inactivate all active terminals of an active polymer chain by a polymerization terminator such as water or an alcohol in an amount sufficient to inactivate all active terminals.

As mentioned above, by properly controlling the amounts of the initiator in the first, second and third stage polymerization, the amounts of the vinyl aromatic hydrocarbon in the first, second, third, fifth and sixth stage polymerization, and the ratio of active terminals inactivated at the end point of the fifth stage polymerization, a linear block copolymer composition can be obtained, characterized in that it has at least three types of polymer blocks with different molecular weights each comprising a vinyl aromatic hydrocarbon as monomer units, (1) the molecular weight distribution (Mw/Mn) of a mixture of the polymer blocks each comprising a vinyl aromatic hydrocarbon as monomer units is within a range of from 3.35 to 6, and (2) in a gel permeation chromatogram of a mixture of the polymer blocks each comprising a vinyl aromatic hydrocarbon as monomer units, M1/M2 is within a range of from 12.5 to 25, where M1 is the peak top molecular weight corresponding to a peak at which the peak top molecular weight becomes maximum among peaks forming a proportion of the area of at least 30% to the whole peak area, and M2 is the peak top molecular weight corresponding to a peak at which the peak top molecular weight becomes minimum among peaks at which the peak top molecular weight is at most 50,000 and which forms a proportion of the area of at least 20% to the whole peak area.

With the linear block copolymer composition of the present invention, various additives may further be blended as the case requires.

In a case where the block copolymer composition is subjected to a heat treatment, or to prevent deterioration of physical properties when a molded product of the composition is used in an oxidizing atmosphere or under irradiation with e.g. ultraviolet rays, or to further improve physical properties suitable for the purpose of use, an additive such as a stabilizer, a lubricant, a processing aid, an antiblocking agent, an antistatic agent, an antifogging agent, a weather resistance-improving agent, a softening agent, a plasticizer or a pigment may, for example, be added.

The stabilizer may, for example, be 2-[1-(2-hydroxy-3,5-di-tert-pentylphenyl)ethyl]-4,6-di-tert-pentylphenyl acrylate, 2-tert-butyl-6-(3-tert-butyl-2-hydroxy-5-methylbenzyl)-4-methylphenyl acrylate, or a phenol antioxidant such as octadecyl-3-(3,5-di-tert-butyl-4-hydroxyphenyl) propionate or 2,6-di-tert-butyl-4-methylphenol, or a phosphorus antioxidant such as 2,2-methylenebis (4,6-di-tert-butylphenyl)octyl phosphite, trisnonylphenyl phosphite or bis(2,6-di-tert-butyl-4-methylphenyl) pentaerythritol-di-phosphite.

Further, the lubricant, processing acid, antiblocking agent, antistatic agent or antifogging agent may, for example, be a saturated fatty acid such as palmitic acid, stearic acid or behenic acid, a fatty acid ester or a pentaerythritol fatty acid ester such as octyl palmitate or octyl stearate, a fatty acid amide such as erucamide, oleamide or stearamide, or an ethylenebisstearamide, a glycerol-mono-fatty acid ester, a glycerol-di-fatty acid ester, a sorbitan fatty acid ester such as sorbitan-mono-palmitate or sorbitan-mono-stearate, or a higher alcohol such as myristyl alcohol, cetyl alcohol or stearyl alcohol.

Further, the weather resistance-improving agent may, for example, be a benzotriazole type such as 2-(2'-hydroxy-3'-tert-butyl-5'-methylphenyl)-5-chlorobenzotriazole, a salicylate type such as 2,4-di-tert-butylphenyl-3',5'-di-tert-butyl-4'-hydroxybenzoate, a benzophenone type ultraviolet absorber such as 2-hydroxy-4-n-octoxybenzophenone, or a hindered amine type weather resistance-improving agent such as tetrakis(2,2,6,6-tetramethyl-4-piperidyl)-1,2,3,4-butanetetracarboxylate. Further, white oil or silicone oil may, for example, be added.

Such an additive is used in an amount of preferably at most 5 mass %, particularly preferably from 0 to 3 mass %, in the linear block copolymer composition of the present invention.

The linear block copolymer composition thus obtained can be easily molded and processed into various practically useful products such as sheets, foams, films, and injection molded products, blow molded products, pressure molded products, vacuum molded products and biaxially oriented products having various shapes, etc., by an optional conventional molding or processing method such as extrusion, injection molding or blow molding.

The linear block copolymer composition of the present invention may be blended with a thermoplastic resin as the case requires to form a resin composition.

As examples of the thermoplastic resin to be used, a polystyrene polymer, a polyphenylene ether polymer, a polyethylene polymer, a polypropylene polymer, a polybutene polymer, a polyvinyl chloride polymer, a polyvinyl acetate polymer, a polyamide polymer, a thermoplastic polyester polymer, a polyacrylate polymer, a polyphenoxy polymer, a polyphenylene sulfide polymer, a polycarbonate polymer, a polyacetal polymer, a polybutadiene polymer, a thermoplastic polyurethane polymer and a polysulfin polymer may, for example, be mentioned. A preferred thermoplastic resin is a styrene polymer, and a polystyrene resin, a styrene-butyl acrylate copolymer or a styrene-methyl methacrylate copolymer is particularly preferably used.

As the blend mass ratio of the linear block copolymer composition of the present invention to the thermoplastic resin, the linear block copolymer composition/thermoplastic resin is preferably from 3/97 to 90/10. If the blend amount of the block copolymer is less than 3 mass %, no sufficient effect of improving impact resistance of the formed resin composition will be obtained, and if the blend amount of the thermoplastic resin is less than 10 mass %, no sufficient effect of improving rigidity, etc. by blending the thermoplastic resin will be obtained. As a particularly preferred blend mass ratio of the linear block copolymer composition to the thermoplastic resin, the linear block copolymer composition/thermoplastic resin is from 30/70 to 80/20, more preferably from 40/60 to 70/30.

Now, the present invention will be explained in further detail with reference to Examples of the present invention. However, the present invention is by no means restricted to such specific Examples.

Data shown in Examples and Comparative Examples were measured in accordance with the following methods.

The peak top molecular weight as calculated as polystyrene and the molecular weight distribution of a linear block copolymer composition, and the molecular weight distribution of a component corresponding to a peak at which the peak top molecular weight becomes maximum among peaks forming a proportion of the area of at least 30% to the whole peak area of the linear block copolymer composition, were determined by means of a GPC method under the measurement conditions 2.

The proportion of the area of each peak to the whole peak area in a chromatogram of the linear block copolymer composition was determined in such a manner that the area of a portion surrounded by the base line and perpendiculars drawn from valleys between peaks to the base line was calculated with respect to each peak and the proportion of the area of each peak to the whole area of the chromatogram of the linear block copolymer composition was obtained as a percentage.

The molecular weight distribution of a component corresponding to a peak at which the peak top molecular weight becomes maximum among peaks forming a proportion of the area of at least 30% to the whole peak area of the linear block copolymer composition, was determined in such a manner that such a peak was selected in a chromatogram of the linear block copolymer composition, perpendiculars were drawn from valleys between adjacent peaks to the base line, and the peak at a portion surrounded by the base line and the perpendiculars was employed to calculate the molecular weight distribution.

Further, the peak top molecular weight as calculated as polystyrene and the molecular weight distribution of polymer blocks comprising a vinyl aromatic hydrocarbon as monomer units were determined by measuring a polymer content obtained by subjecting the linear block copolymer composition to ozonolysis and then reduction with lithium aluminum hydride by means of a GPC method under the measurement conditions 1. The proportion of the area of each peak to the whole peak area in a chromatogram of the polymer block comprising a vinyl aromatic hydrocarbon as monomer units was determined similarly to the determination of the proportion of the area of each peak to the whole peak area in a chromatogram of the linear block copolymer composition, in such a manner that the area of a portion surrounded by the base line and perpendiculars drawn from valleys between peaks to the base line was calculated with respect to each peak, and the proportion of the area of each peak to the whole area of the chromatogram of the linear block copolymer composition was obtained as a percentage.

The total luminous transmittance and the haze were measured in accordance with JIS-K7105 and the Charpy impact strength was measured in accordance with JIS K-7111 (notched) by molding a test specimen from resin pellets by a injection molding machine. Similarly, the falling weight impact strength was measured in such a manner that a flat plate with a thickness of 2 mm was formed by an injection molding machine, and by using a Falling Weight type Graphic Impact Tester (trade mark for instrumented falling weight impact tester manufactured by Toyo Seiki Seisaku-Sho, Ltd.), a heavy weight with a mass of 6.5 kg was made to freely fall from a height of 62 cm on the plane of the test specimen fixed in a holder (diameter: 40 mm), and the test specimen was completely destroyed or pierced by means of a striker (diameter: 12.7 mm) provided at the bottom of the heavy weight, and the total energy (hereinafter referred to as total absorbed energy) required at this time was measured. Further, the amount of a polybutadiene rubber component (PBd amount) in the linear block copolymer composition was determined by a halogen addition method of adding iodine chloride to a double bond. Further, fluidity (MFR) at a high temperature was measured in accordance with JIS K-7210.

EXAMPLE 1

A linear block copolymer composition is obtained by a conventional living anionic polymerization method using an organic lithium compound as an initiator in a hydrocarbon solvent.

Specifically, a jacketed stainless steel polymerization tank equipped with a stirrer, having an internal volume of 10 L, was washed with cyclohexane, and the air in the polymerization tank was replaced with nitrogen, and then 4,200 g of cyclohexane dehydrated to a moisture content of at most 7 ppm, containing 150 ppm of tetrahydrofuran, was charged into the polymerization tank, and then 377 g of styrene dehydrated to a moisture content of at most 7 ppm was added. The internal temperature was increased to 50° C., and then 4.2 ml of a n-butyllithium 10 mass % cyclohexane solution was added, and polymerization was carried out for 20 minutes so that the maximum temperature would not exceed 120° C. (first stage polymerization).

Then, at a constant internal temperature of 50° C., 4.7 ml of a n-butyllithium 10 mass % cyclohexane solution and then 80 g of styrene dehydrated to a moisture content of at most 7 ppm were added, and polymerization was carried out for 20 minutes so that the maximum temperature would no exceed 120° C. (second stage polymerization).

Then, at a constant internal temperature of 50° C., 7.8 ml of a n-butyllithium 10 mass % cyclohexane solution and then 142 g of styrene dehydrated to a moisture content of at most 7 ppm were added, and polymerization was carried out for 15 minutes so that the maximum temperature would not exceed 120° C. (third stage polymerization).

Further, the internal temperature was increased to 80° C., and then 310 g of butadiene dehydrated by being passed through molecular sieves was added, and polymerization was carried out for 20 minutes so that the maximum temperature would not exceed 120° C. (fourth stage polymerization).

Then, at a constant internal temperature of 80° C., 142 g of styrene dehydrated to a moisture content of at most 7 ppm was added, and polymerization was carried out for 15 minutes so that the maximum temperature would not exceed 120° C. (fifth stage polymerization).

Finally, all polymer active terminals were inactivated by methanol. 2,4-Bis[(octylthio)methyl]-o-cresol as a stabilizer was added in a proportion of 0.2 mass % per 100 parts by mass of the polymer, and then the polymer liquid was diluted with cyclohexane, and the obtained solution was poured into a large amount of methanol to precipitate a polymer content, which was vacuum-dried to obtain a powdery polymer.

The obtained powdery polymer was supplied to a 20 mm single screw extruder, and a molten strand was withdrawn from a die at 210° C., cooled with water and cut by a cutter to obtain resin pellets.

The charge amounts are shown in Table 1, analyzed values are shown in Tables 2 and 3, and results of evaluation of solid physical properties are shown in Table 4.

Figure 2:
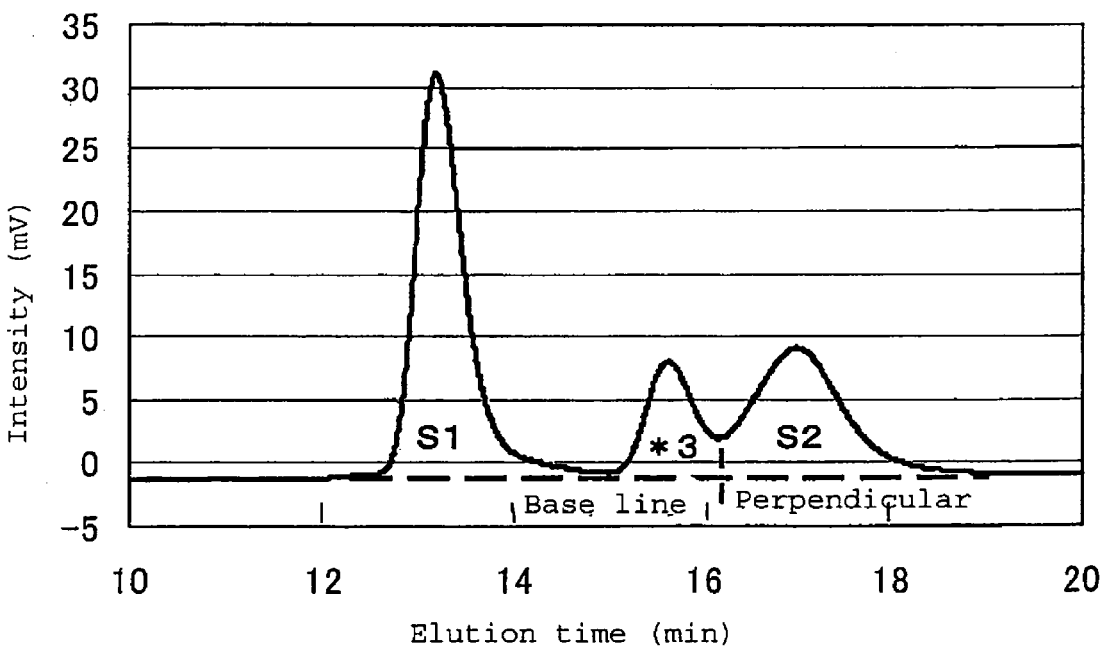
FIG. 2. is a chromatogram of a polymer content obtained by subjecting a linear block copolymer composition to ozonolysis and then reduction with lithium aluminum hydride.

Further, a chromatogram of the linear block copolymer composition of Example 1 measured under the measurement conditions 2 is shown in FIG. 1, and a chromatogram of a polymer content obtained by subjecting the obtained linear block copolymer composition to ozonolysis and then reduction with lithium aluminum hydride is shown in FIG. 2.

EXAMPLES 2 AND 3 AND COMPARATIVE EXAMPLES 1 TO 4

Pellets were obtained in formulae as shown in Table 1 in the same manner as in Example 1.

Analyzed values are shown in Tables 2 and 3 and results of evaluation of solid physical properties are shown in Table 4.

TABLE 1

Amount of materials charged

| | Example 1 | Example 2 | Example 3 | Comp. Ex. 1 | Comp. Ex. 2 | Comp. Ex. 3 | Comp. Ex. 4 |
|---|---|---|---|---|---|---|---|
| Solvent cyclohexane (g) | 4200 | 4360 | 4370 | 4400 | 4370 | 4410 | 4380 |
| Solvent/total monomer amount (weight ratio) | 4.0 | 4.0 | 4.0 | 4.0 | 4.0 | 4.0 | 4.0 |
| First stage n-BuLi 10% cyclohexane solution (ml) | 4.2 | 4.5 | 4.8 | 3.9 | 5.2 | 6.6 | 4.8 |
| First stage styrene (g) | 377 | 406 | 387 | 334 | 493 | 397 | 371 |
| Second stage n-BuLi 10% cyclohexane solution (ml) | 4.7 | 1.6 | 5.3 | 1.4 | 4.1 | 5.5 | 3.7 |
| Second stage styrene (g) | 80 | 52 | 83 | 43 | 84 | 113 | 228 |
| Third stage n-BuLi 10% cyclohexane solution (ml) | 7.8 | 10.4 | 8.8 | 9.6 | 2 | 2.8 | 1.9 |
| Third stage styrene (g) | 142 | 147 | 145 | 126 | 93 | 126 | 84 |
| Fourth stage butadiene (g) | 310 | 340 | 334 | 330 | 327 | 327 | 329 |
| Fifth stage styrene (g) | 142 | 147 | 145 | 268 | 93 | 126 | 84 |

TABLE 2

Analyzed values of polymer content obtained after ozonolysis of linear block copolymer composition

| | Example 1 | Example 2 | Example 3 | Comp. Ex. 1 | Comp. Ex. 2 | Comp. Ex. 3 | Comp. Ex. 4 |
|---|---|---|---|---|---|---|---|
| GPC measurement conditions | 1 | 1 | 1 | 1 | 1 | 1 | 1 |
| Peak top molecular weight M1 | 126000 | 136000 | 132000 | 107000 | 126000 | 82000 | 128000 |
| Peak top molecular weight M2 | 8800 | 8800 | 8300 | 17500 | 8500 | 8400 | 8600 |
| Peak top molecular weight M5 | 22000 | 24000 | 19000 | No peak satisfying conditions detected | 19900 | 21000 | 11800 |
| Proportion (%) of number of moles of component S1 to the sum of numbers of moles of components S1 and S2 | 10.7 | 9.0 | 7.5 | 15.4 | 27.5 | 28.0 | 25.0 |
| M1/M2 | 14.3 | 15.5 | 15.9 | 6.11 | 14.8 | 9.76 | 14.9 |
| M5/M2 | 2.50 | 2.73 | 2.29 | | 2.34 | 2.50 | 1.37 |
| Molecular weight distribution (Mw/Mn) | 3.61 | 4.21 | 3.89 | 2.83 | 2.90 | 2.45 | 2.69 |

TABLE 3

Analyzed values of linear block copolymer composition

| | Example 1 | Example 2 | Example 3 | Comp. Ex. 1 | Comp. Ex. 2 | Comp. Ex. 3 | Comp. Ex. 4 |
|---|---|---|---|---|---|---|---|
| GPC measurement conditions | 2 | 2 | 2 | 2 | 2 | 2 | 2 |
| Molecular weight distribution of a component at which the peak top molecular weight becomes maximum among peaks forming a proportion of at least 30% (Mw/Mn) | 1.004 | 1.004 | 1.004 | 1.006 | 1.004 | 1.004 | 1.005 |
| Peak top molecular weight M3 | 174200 | 191000 | 185300 | 181000 | 164000 | 123000 | 165000 |
| Peak top molecular weight M4 | 50300 | 53100 | 51400 | 75000 | 57000 | 55000 | 55000 |
| M3/M4 | 3.5 | 3.6 | 3.6 | 2.4 | 2.9 | 2.2 | 3.0 |
| Peak top molecular weight of a component providing a maximum peak | 174200 | 191000 | 185300 | 181000 | 164000 | 123000 | 165000 |

TABLE 4

Results of measurement of physical properties of linear block copolymer composition

|  | Example 1 | Example 2 | Example 3 | Comp. Ex. 1 | Comp. Ex. 2 | Comp. Ex. 3 | Comp. Ex. 4 |
|---|---|---|---|---|---|---|---|
| PBd amount (%) | 29 | 31 | 31 | 29 | 30 | 30 | 30 |
| MFR (g/10 min) | 12.3 | 10.1 | 9.9 | 7.6 | 11 | 31.1 | 9.7 |
| Haze (%) | 1.3 | 1.5 | 1.5 | 1.4 | 1.4 | 1.4 | 1.5 |
| Total luminous transmittance (%) | 90 | 88.7 | 89 | 90 | 89.8 | 90.1 | 88.9 |
| Total absorbed energy (J) | 15.5 | 16.3 | 16.5 | 7 | 9.9 | 3.5 | 4.9 |
| Charpy impact strength (kJ/m) | 2.9 | 9.8 | 7.8 | 1.1 | 1.2 | 1.1 | 1.1 |

EXAMPLE 4

A jacketed stainless steel polymerization tank equipped with a stirrer, having an internal volume of 10 L, was washed with cyclohexane, and the air in the polymerization tank was replaced with nitrogen, and then 4,400 g of cyclohexane dehydrated to a moisture content of at most 7 ppm, containing 150 ppm of tetrahydrofuran, was charged into the polymerization tank, and then 360 g of styrene dehydrated to a moisture content of at most 7 ppm was added. The internal temperature was increased to 50° C., and then 3.0 ml of a n-butyllithium 10 mass % cyclohexane solution was added, and polymerization was carried out for 20 minutes so that the maximum temperature would not exceed 120° C. (first stage polymerization).

Then, at a constant internal temperature of 50° C., 1.5 ml of a n-butyllithium 10 mass % cyclohexane solution and then 45 g of styrene dehydrated to a moisture content of at most 7 ppm were added, and polymerization was carried out for 20 minutes so that the maximum temperature would no exceed 120° C. (second stage polymerization).

Then, at a constant internal temperature of 50° C., 10.4 ml of a n-butyllithium 10 mass % cyclohexane solution and then 136 g of styrene dehydrated to a moisture content of at most 7 ppm were added, and polymerization was carried out for 15 minutes so that the maximum temperature would not exceed 120° C. (third stage polymerization).

Further, the internal temperature was increased to 80° C., and then 340 g of butadiene dehydrated by being passed through molecular sieves was added, and polymerization was carried out for 20 minutes so that the maximum temperature would not exceed 120° C. (fourth stage polymerization).

Then, at a constant internal temperature of 80° C., 136 g of styrene dehydrated to a moisture content of at most 7 ppm was added, and polymerization was carried out for 15 minutes so that the maximum temperature would not exceed 120° C. (fifth stage polymerization).

Further, 0.28 g of water dispersed in 30 ml of cyclohexane was added to inactivate part of polymer active terminals, and then 73 g of styrene dehydrated to a moisture content of at most 7 ppm was added, and polymerization was carried out for 15 minutes so that the maximum temperature would not exceed 120° C. (sixth stage polymerization).

Finally, all polymer active terminals were inactivated by methanol. 2,4-Bis[(octylthio)methyl]-o-cresol as a stabilizer was added in a proportion of 0.2 mass % per 100 parts by mass of the polymer, and then the polymer liquid was diluted with cyclohexane, and the obtained solution was poured into a large amount of methanol to precipitate a polymer content, which was vacuum-dried to obtain a powdery polymer.

The obtained powdery polymer was supplied to a 20 mm single screw extruder, and a molten strand was withdrawn from a die at 210° C., cooled with water and cut by a cutter to obtain resin pellets. The charge amounts are shown in Table 5, analyzed values are shown in Tables 6 and 7, and results of evaluation of solid physical properties are shown in Table 8.

EXAMPLE 5 AND COMPARATIVE EXAMPLES 5 AND 6

Powdery polymers were obtained in formulae as shown in Table 5 in the same manner as in Example 4.

Analyzed values are shown in Tables 6 to 7, and results of evaluation of solid physical properties are shown in Table 8.

TABLE 5

Amount of materials charged

|  | Example 4 | Example 5 | Comp. Ex. 5 | Comp. Ex. 6 |
|---|---|---|---|---|
| Solvent cyclohexane (g) | 4360 | 4360 | 4390 | 4410 |
| Solvent/total monomer amount (weight ratio) | 4.0 | 4.0 | 4.0 | 4.0 |
| First stage n-BuLi 10% cyclohexane solution (ml) | 3 | 3 | 4 | 4.5 |
| First stage styrene (g) | 360 | 360 | 346 | 322 |
| Second stage n-BuLi 10% cyclohexane solution (ml) | 1.5 | 1.5 | 5.7 | 6.8 |
| Second stage styrene (g) | 46 | 46 | 88 | 140 |
| Third stage n-BuLi 10% cyclohexane solution (ml) | 10.4 | 10.4 | 5.7 | 6.8 |
| Third stage styrene (g) | 136 | 136 | 131 | 97 |
| Fourth stage butadiene (g) | 340 | 340 | 329 | 331 |
| Fifth stage styrene (g) | 136 | 136 | 131 | 97 |
| Sixth stage water (g) | 0.28 | 0.16 | 0.15 | 0.18 |
| Sixth stage styrene (g) | 73 | 73 | 73 | 116 |

TABLE 6

Analyzed values of polymer content obtained after ozonolysis of linear block copolymer composition

|  | Example 4 | Example 5 | Comp. Ex. 5 | Comp. Ex. 6 |
|---|---|---|---|---|
| GPC measurement conditions | 1 | 1 | 1 | 1 |
| Peak top molecular weight M1 | 113000 | 122000 | 117000 | 99000 |
| Peak top molecular weight M2 | 8500 | 9100 | 5800 | 18000 |
| Peak top molecular weight M5 | 22000 | 21000 | 29000 | No peak satisfying conditions detected |
| Proportion (%) of number of moles of component S1 to the sum of numbers of moles of components S1 and S2 | 11.0 | 14.2 | 18.2 | 16.7 |

TABLE 6-continued

Analyzed values of polymer content obtained after ozonolysis of linear block copolymer composition

|  | Example 4 | Example 5 | Comp. Ex. 5 | Comp. Ex. 6 |
|---|---|---|---|---|
| M1/M2 | 13.3 | 13.4 | 20.2 | 5.50 |
| M5/M2 | 2.59 | 2.31 | 5.00 | |
| Molecular weight distribution (Mw/Mn) | 3.70 | 3.42 | 3.01 | 2.92 |

TABLE 7

Analyzed values of linear block copolymer composition

|  | Example 4 | Example 5 | Comp. Ex. 5 | Comp. Ex. 6 |
|---|---|---|---|---|
| GPC measurement conditions | 2 | 2 | 2 | 2 |
| Molecular weight distribution of a component at which the peak top molecular weight becomes maximum among peaks forming a proportion of the area of at least 30% to the whole peak area (Mw/Mn) | 1.004 | 1.004 | 1.004 | 1.003 |
| Peak top molecular weight M3 | 165140 | 169000 | 169000 | 144000 |
| Peak top molecular weight M4 | 54000 | 54000 | 50600 | 48000 |
| M3/M4 | 3.1 | 3.1 | 3.3 | 3.0 |
| Peak top molecular weight of a component providing a maximum peak | 165140 | 169000 | 169000 | 144000 |

TABLE 8

Results of measurement of physical properties of linear block copolymer composition

|  | Example 4 | Example 5 | Comp. Ex. 5 | Comp. Ex. 6 |
|---|---|---|---|---|
| PBd amount (%) | 31 | 31 | 30 | 30 |
| MFR (g/10 min) | 11.1 | 9.7 | 7.7 | 25.1 |
| Haze (%) | 1.4 | 1.6 | 1.3 | 1.6 |
| Total luminous transmittance (%) | 90 | 87 | 90 | 87.1 |
| Total absorbed energy (J) | 16.5 | 18.1 | 6.1 | 9.9 |
| Charpy impact strength (kJ/m) | 5.6 | 9.9 | 1.2 | 1.1 |

REFERENCE EXAMPLE 1

Polymerization was carried out in a formula as shown in Table 9 in the same manner as in Example 1.

TABLE 9

Amount of materials charged

|  | Reference Example 1 |
|---|---|
| Solvent cyclohexane (g) | 4200 |
| Solvent/total monomer amount (weight ratio) | 4.1 |
| First stage n-BuLi 10% cyclohexane solution (ml) | 4 |
| First stage styrene (g) | 360 |
| Second stage n-BuLi 10% cyclohexane solution (ml) | 1.5 |
| Second stage styrene (g) | 46 |
| Third stage n-BuLi 10% cyclohexane solution (ml) | 10.1 |
| Third stage styrene (g) | 136 |
| Fourth stage butadiene (g) | 338 |
| Fifth stage styrene (g) | 136 |

EXAMPLE 6

260 g of the powdery polymer obtained in the above Reference Example 1 and 250 g of the powdery polymer obtained in Comparative Example 2 were blended and supplied to a 20 mm single screw extruder, and a molten strand was withdrawn from a die at 210° C., cooled with water and cut by a cutter to obtain resin pellets.

Analyzed values are shown in Tables 10 and 11, and results of evaluation of solid physical properties are shown in Table 12.

TABLE 10

Analyzed values of polymer content obtained after ozonolysis of linear block copolymer composition

|  | Example 6 | Example 7 | Comp. Ex. 7 | Comp. Ex. 8 |
|---|---|---|---|---|
| GPC measurement conditions | 1 | 1 | 1 | 1 |
| Peak top molecular weight M1 | 114000 | 115000 | 114000 | 115000 |
| Peak top molecular weight M2 | 8800 | 9000 | 8800 | 9000 |
| Peak top molecular weight M5 | 21000 | 20000 | 21000 | 21000 |
| Proportion (%) of number of moles of component S1 to the sum of numbers of moles of components S1 and S2 | 14.3 | 11.8 | 18.2 | 26.7 |
| M1/M2 | 13.0 | 12.8 | 13.0 | 12.8 |
| M5/M2 | 2.39 | 2.22 | 2.39 | 2.33 |
| Molecular weight distribution (Mw/Mn) | 3.45 | 3.42 | 2.89 | 2.65 |

TABLE 11

Analyzed values of linear block copolymer composition

|  | Example 6 | Example 7 | Comp. Ex. 7 | Comp. Ex. 8 |
|---|---|---|---|---|
| GPC measurement conditions | 2 | 2 | 2 | 2 |
| Molecular weight distribution of a component at which the peak top molecular weight becomes maximum among peaks forming a proportion of the area of at least 30% to the whole peak area (Mw/Mn) | 1.017 | 1.025 | 1.023 | 1.025 |
| Peak top molecular weight M3 | 175000 | 177500 | 175000 | 177500 |
| Peak top molecular weight M4 | 56000 | 57500 | 56000 | 57500 |
| M3/M4 | 3.1 | 3.1 | 3.1 | 3.1 |
| Peak top molecular weight of a component providing a maximum peak | 175000 | 177500 | 175000 | 177500 |

TABLE 12

Results of measurement of physical properties of linear block copolymer composition

|  | Example 6 | Example 7 | Comp. Ex. 7 | Comp. Ex. 8 |
|---|---|---|---|---|
| PBd amount (%) | 30 | 30 | 29 | 28 |
| MFR (g/10 min) | 12.1 | 10.5 | 11.8 | 11.5 |
| Haze (%) | 1.3 | 1.3 | 1.2 | 1.2 |
| Total luminous transmittance (%) | 89.1 | 89 | 90.1 | 89.8 |
| Total absorbed energy (J) | 16.5 | 15.5 | 4.5 | 5.6 |
| Charpy impact strength (kJ/m) | 5.9 | 6.1 | 1.1 | 1.2 |

COMPARATIVE EXAMPLE 7

260 g of the powdery polymer obtained in Reference Example 1 and 350 g of the powdery polymer obtained in Comparative Example 2 were blended and supplied to a 20 mm single screw extruder, and a molten strand was withdrawn from a die at 210° C., cooled with water and cut by a cutter to obtain resin pellets.

Analyzed values are shown in Tables 10 and 11, and results of evaluation of solid physical properties are shown in Table 12.

REFERENCE EXAMPLE 2

A powdery polymer was obtained in a formula as shown in Table 13 in accordance with the following procedure.

A jacketed stainless steel polymerization tank equipped with a stirrer, having an internal volume of 3 L, was washed with cyclohexane, and the air in the polymerization tank was replaced with nitrogen, and then 1,360 g of cyclohexane dehydrated to a moisture content of at most 7 ppm, containing 150 ppm of tetrahydrofuran, was charged into the polymerization tank, and then 257 g of styrene dehydrated to a moisture content of at most 7 ppm was added. The internal temperature was increased to 50° C., and then 2.0 ml of a n-butyllithium 10 mass % cyclohexane solution was added, and polymerization was carried out for 20 minutes so that the maximum temperature would not exceed 120° C. (first stage polymerization).

Then, the internal temperature was increased to 80° C., and 33 g of butadiene dehydrated by being passed through molecular sieves was added, and polymerization was carried out for 20 minutes so that the maximum temperature would not exceed 120° C. (second stage polymerization).

Then, at a constant internal temperature of 80° C., 37 g of styrene dehydrated to a moisture content of at most 7 ppm was added, and polymerization was carried out for 15 minutes so that the maximum temperature would not exceed 120° C. (third stage polymerization).

Finally, all polymer active terminals were inactivated by methanol. 2,4-Bis[(octylthio)methyl]-O-cresol as a stabilizer was added in a proportion of 0.2 mass % per 100 parts by mass of the polymer, and then the polymer liquid was diluted with cyclohexane, and the obtained solution was poured into a large amount of methanol to precipitate a polymer content, which was vacuum-dried to obtain a powdery polymer.

TABLE 13

Amount of materials charged

| | Reference Example 2 |
|---|---|
| Solvent cyclohexane (g) | 1360 |
| Solvent/total monomer amount (weight ratio) | 4.2 |
| First stage n-BuLi 10% cyclohexane solution (ml) | 2.1 |
| First stage styrene (g) | 257 |
| Second stage butadiene (g) | 33 |
| Third stage styrene (g) | 37 |

EXAMPLE 7

325 g of the powdery polymer obtained in Reference Example 1 and 50 g of the powdery polymer obtained in Reference Example 2 as described hereinafter were blended and supplied to a 20 mm single screw extruder, and a molten strand was withdrawn from a die at 210° C., cooled with water and cut by a cutter to obtain resin pellets.

Analyzed values are shown in Tables 10 and 11, and results of evaluation of solid physical properties are shown in Table 12.

COMPARATIVE EXAMPLE 8

250 g of the powdery polymer obtained in Reference Example 1 and 100 g of the powdery polymer obtained in Reference Example 2 were blended and supplied to a 20 mm single screw extruder, and a molten strand was withdrawn from a die at 210° C., cooled with water and cut by a cutter to obtain resin pellets.

Analyzed values are shown in Tables 10 and 11, and results of evaluation of solid physical properties are shown in Table 12.

COMPARATIVE EXAMPLE 9

A jacketed stainless steel polymerization tank equipped with a stirrer, having an internal volume of 10 L, was washed with cyclohexane, and the air in the polymerization tank was replaced with nitrogen, and then 4,360 g of cyclohexane dehydrated to a moisture content of at most 7 ppm, containing 150 ppm of tetrahydrofuran, was charged into the polymerization tank, and then 474 g of styrene dehydrated to a moisture content of at most 7 ppm was added. The internal temperature was increased to 50° C., and then 5.2 ml of a n-butyllithium 10 mass % cyclohexane solution was added, and polymerization was carried out for 20 minutes so that the maximum temperature would not exceed 120° C. (first stage polymerization).

Then, at a constant internal temperature of 50° C., 6.9 ml of a n-butyllithium 10 mass % cyclohexane solution and then 209 g of styrene dehydrated to a moisture content of at most 7 ppm were added, and polymerization was carried out for 15 minutes so that the maximum temperature would no exceed 120° C. (second stage polymerization).

Further, the internal temperature was increased to 80° C., and then 310 g of butadiene dehydrated by being passed through molecular sieves was added, and polymerization was carried out for 20 minutes so that the maximum temperature would not exceed 120° C. (third stage polymerization).

Then, at a constant internal temperature of 80° C., 100 g of styrene dehydrated to a moisture content of at most 7 ppm was added, and polymerization was carried out for 15 minutes so that the maximum temperature would not exceed 120° C. (fourth stage polymerization).

Finally, all polymer active terminals were inactivated by methanol. 2,4-Bis[(octylthio)methyl]-o-cresol as a stabilizer was added in a proportion of 0.2 mass % per 100 parts by mass of the polymer, and then the polymer liquid was diluted with cyclohexane, and the obtained solution was poured into a large amount of methanol to precipitate a polymer content, which was vacuum-dried to obtain a powdery polymer.

The obtained powdery polymer was supplied to a 20 mm single screw extruder, and a molten strand was withdrawn from a die at 210° C., cooled with water and cut by a cutter to obtain resin pellets.

The charge amounts are shown in Table 14, analyzed values are shown in Tables 15 and 16, and results of evaluation of solid physical properties are shown in Table 17.

COMPARATIVE EXAMPLES 10 AND 11

Pellets were obtained in formulae as shown in Table 14 in the same manner as in Comparative Example 9.

Analyzed values are shown in Tables 15 and 16, and results of evaluation of solid physical properties are shown in Table 17.

TABLE 14

Amount of materials charged

| | Comp. Ex. 9 | Comp. Ex. 10 | Comp. Ex. 11 |
|---|---|---|---|
| Solvent cyclohexane (g) | 4360 | 4389 | 4453 |
| Solvent/total monomer amount (weight ratio) | 4.0 | 4.2 | 4.5 |
| First stage n-BuLi 10% cyclohexane solution (ml) | 5.2 | 4 | 5 |
| First stage styrene (g) | 474 | 348 | 484 |
| Second stage n-BuLi 10% cyclohexane solution (ml) | 6.9 | 11 | 5.7 |
| Second stage styrene (g) | 209 | 188 | 93 |
| Third stage butadiene (g) | 310 | 329 | 315 |
| Fourth stage styrene (g) | 100 | 188 | 93 |

TABLE 15

Analyzed values of polymer content obtained after ozonolysis of linear block copolymer composition

| | Comp. Ex. 9 | Comp. Ex. 10 | Comp. Ex. 11 |
|---|---|---|---|
| GPC measurement conditions | 1 | 1 | 1 |
| Peak top molecular weight M1 | 138000 | 123000 | 123000 |
| Peak top molecular weight M2 | 21000 | 12000 | 8100 |
| Peak top molecular weight M5 | No peak satisfying conditions detected | No peak satisfying conditions detected | No peak satisfying conditions detected |
| Proportion (%) of number of moles of component S1 to the sum of numbers of moles of components S1 and S2 | 26.4 | 10.0 | 19.6 |
| M1/M2 | 6.57 | 10.3 | 15.2 |
| M5/M2 | — | — | — |
| Molecular weight distribution (Mw/Mn) | 2.82 | 3.09 | 3.45 |

TABLE 16

Analyzed values of linear block copolymer composition

| | Comp. Ex. 9 | Comp. Ex. 10 | Comp. Ex. 11 |
|---|---|---|---|
| GPC measurement conditions | 2 | 2 | 2 |
| Molecular weight distribution of a component at which the peak top molecular weight becomes maximum among peaks forming a proportion of the area of at least 30% to the whole peak area (Mw/Mn) | 1.005 | 1.004 | 1.003 |
| Peak top molecular weight M3 | 203200 | 155000 | 148000 |
| Peak top molecular weight M4 | 81000 | 38000 | 36000 |
| M3/M4 | 2.5 | 4.1 | 4.1 |
| Peak top molecular weight of a component providing a maximum peak | 203200 | 155000 | 148000 |

TABLE 17

Results of measurement of physical properties of linear block copolymer composition

| | Comp. Ex. 9 | Comp. Ex. 10 | Comp. Ex. 11 |
|---|---|---|---|
| PBd amount (%) | 28 | 31 | 32 |
| MFR (g/10 min) | 6.9 | 15.9 | 20.5 |
| Haze (%) | 1.1 | 1.2 | 1.2 |
| Total luminous transmittance (%) | 90.5 | 90 | 90 |
| Total absorbed energy (J) | 7.4 | 9 | 8.9 |
| Charpy impact strength (kJ/m) | 1.2 | 1.2 | 1.2 |

EXAMPLES 8 TO 14 AND COMPARATIVE EXAMPLE 12 TO 22

Each of the linear block copolymer compositions obtained in Examples 1 to 7 and Comparative Examples 1 to 11 and a general purpose polystyrene (Gl4L, manufactured by TOYO STYRENE CO., LTD.) were blended in a weight ratio of linear block copolymer composition/general purpose polystyrene of 6/4 and supplied to a 20 mm single screw extruder, and then a melt strand was withdrawn from a die at 230° C., cooled with water and cut by a cutter to obtain resin pellets. Then, physical properties were evaluated in the same manner as in Example 1. The results are shown in Tables 18 to 20.

TABLE 18

Results of measurement of physical properties of blended product of linear block copolymer composition and general purpose polystyrene

| | Example 8 | Example 9 | Example 10 | Example 11 | Example 12 | Example 13 | Example 14 |
|---|---|---|---|---|---|---|---|
| Linear block copolymer composition used | Copolymer composition of Ex. 1 | Copolymer composition of Ex. 2 | Copolymer composition of Ex. 3 | Copolymer composition of Ex. 4 | Copolymer composition of Ex. 5 | Copolymer composition of Ex. 6 | Copolymer composition of Ex. 7 |
| MFR (g/10 min) | 11.3 | 10.8 | 9.7 | 8.1 | 7.5 | 8.8 | 14.9 |
| Haze (%) | 2 | 8.5 | 7 | 6.5 | 6.9 | 5.5 | 3.5 |
| Total luminous transmittance (%) | 84.8 | 79.9 | 80.5 | 82.4 | 81.5 | 82.9 | 84 |
| Total absorbed energy (J) | 3.1 | 15.6 | 14.5 | 12.7 | 16.8 | 11.9 | 6.5 |
| Charpy impact strength (kJ/m) | 1.2 | 1.3 | 1.4 | 1.3 | 1.5 | 1.3 | 1.3 |

TABLE 19

Results of measurement of physical properties of blended product of linear block copolymer composition and general purpose polystyrene

| | Comp. Ex. 12 | Comp. Ex. 13 | Comp. Ex. 14 | Comp. Ex. 15 | Comp. Ex. 16 | Comp. Ex. 17 |
|---|---|---|---|---|---|---|
| Linear block copolymer composition used | Copolymer composition of Comp. Ex. 1 | Copolymer composition of Comp. Ex. 2 | Copolymer composition of Comp. Ex. 3 | Copolymer composition of Comp. Ex. 4 | Copolymer composition of Comp. Ex. 5 | Copolymer composition of Comp. Ex. 6 |
| MFR (g/10 min) | 6.3 | 9 | 15.8 | 6.9 | 5.3 | 15 |
| Haze (%) | 4 | 3.3 | 3.9 | 3.5 | 2.8 | 2.5 |
| Total luminous transmittance (%) | 81.1 | 84.5 | 82.1 | 83.5 | 85.5 | 86 |
| Total absorbed energy (J) | 1.5 | 0.8 | 0.9 | 1.9 | 0.9 | 1.3 |
| Charpy impact strength (kJ/m) | 1.8 | 1.1 | 0.9 | 0.9 | 1.1 | 1.2 |

TABLE 20

Results of measurement of physical properties of blended product of linear block copolymer composition and general purpose polystyrene

| | Comp. Ex. 18 | Comp. Ex. 19 | Comp. Ex. 20 | Comp. Ex. 21 | Comp. Ex. 22 |
|---|---|---|---|---|---|
| Linear block copolymer composition used | Copolymer composition of Comp. Ex. 7 | Copolymer composition of Comp. Ex. 8 | Copolymer composition of Comp. Ex. 9 | Copolymer composition of Comp. Ex. 10 | Copolymer composition of Comp. Ex. 11 |
| MFR (g/10 min) | 8.8 | 5.9 | 2.8 | 10.3 | 14.9 |
| Haze (%) | 4 | 3.9 | 3.8 | 4.2 | 3.5 |
| Total luminous transmittance (%) | 81.1 | 81.5 | 84.8 | 83.1 | 84 |
| Total absorbed energy (J) | 1.2 | 0.8 | 1.1 | 1.9 | 1.5 |
| Charpy impact strength (kJ/m) | 1.3 | 1.4 | 1.8 | 1 | 1 |

INDUSTRIAL APPLICABILITY

The linear block copolymer composition of the present invention is useful for applications to which a conventional block copolymer is used, such as modifiers for various thermoplastic resins and thermosetting resins, raw materials for footwear, raw materials for tackifiers and adhesives, modifiers for asphalt, raw materials for wire cables and modifiers for vulcanized rubber. Particularly, a composition obtained by blending the linear block copolymer composition of the present invention with a thermoplastic resin is useful as a raw material for sheets and films, and is useful for food packaging containers and further for commodity packaging and laminate sheets and films, by virtue of its excellent transparency, impact resistance and low temperature characteristics.

The invention claimed is:

1. A linear block copolymer composition, comprising from 55 to 95 mass % of a vinyl aromatic hydrocarbon and from 5 to 45 mass % of a conjugated diene as monomer units; wherein:
    the linear block copolymer composition is a mixture comprising linear block copolymers having at least three types of polymer blocks with different molecular weights represented by the following formula:

S—B—S where S is a polymer block comprising a vinyl aromatic hydrocarbon as monomer units, and B is a polymer block consisting of conjugated diene monomer units;
    a molecular weight distribution (Mw/Mn) of a mixture of the polymer blocks is within a range of from 3.35 to 6;
    in a gel permeation chromatogram of the mixture of the polymer blocks, M1/M2 is within a range of from 12.5 to 25, where M1 is a largest peak top molecular weight among peak top molecular weights corresponding to peaks forming at least 30% of a whole peak area, and M2 is a smallest peak top molecular weight among peak top molecular weights of 50,000 or less corresponding to peaks forming at least 20% of the whole peak area; and
    the linear block copolymer composition is obtained by:
        preparing a polymer system by carrying out anionic polymerization of a first charge of a vinyl aromatic and an initiator;
        adding a second charge of a vinyl aromatic hydrocarbon and an initiator to the polymerization system;
        adding a third charge of a vinyl aromatic hydrocarbon and an initiator to the polymerization system, the first, second, and third charges resulting in formation three types of vinyl aromatic hydrocarbon blocks having different peak top molecular weights;
        adding a fourth charge of a conjugated diene;

adding a fifth charge of a vinyl aromatic hydrocarbon; and inactivating all active terminals of the obtained polymers.

2. The linear block copolymer composition according to claim 1, wherein:
in a gel permeation chromatogram of a mixture of the polymer blocks, a proportion of a number of moles of S1 to a sum of the number of moles of S1 and a number of moles of S2 is within a range of from 5 to 25 mol %;
S1 is a component corresponding to the largest peak top molecular weight among peak top molecular weights corresponding to peaks forming at least 30% of the whole peak area; and
S2 is a component corresponding to the smallest peak top molecular weight among peak top molecular weights of 50,000 or less corresponding to peaks forming at least 20% of the whole peak area.

3. The linear block copolymer composition according to claim 1 or 2, wherein M2 is within a range of from 4,500 to 20,000.

4. The linear block copolymer composition according to claim 1, wherein M1 is within a range of from 90,000 to 200,000.

5. The linear block copolymer composition according to claim 1, wherein, in a gel permeation chromatogram of the linear block copolymer composition, a molecular weight distribution (Mw/Mn) of a component corresponding to a largest peak top molecular weight among peak top molecular weights corresponding to peaks forming at least 30% of the whole peak area, is less than 1.03.

6. The linear block copolymer composition according to claim 1, wherein, in a gel permeation chromatogram of the linear block copolymer composition, a peak top molecular weight of a component corresponding to a peak having a largest peak area is within a range of from 120,000 to 250,000.

7. A composition, comprising:
the linear block copolymer composition according to claim 1; and
a thermoplastic resin other than the linear block copolymer composition.

8. The composition according to claim 7, wherein a mass ratio of the linear block copolymer composition to the thermoplastic resin is from 30/70 to 70/30.

9. The composition according to claim 7, wherein the thermoplastic resin is a polystyrene polymer.

10. The composition according to claim 1, wherein the vinyl aromatic hydrocarbon monomer unit is styrene, and the conjugated diene monomer unit is butadiene.

11. The composition according to claim 1, wherein, in a gel permeation chromatogram of the linear block copolymer composition, M3/M4 is within a range of from 2.5 to 4.5, where M3 is a largest peak top molecular weight among peak top molecular weights corresponding to peaks forming at least 30% of a whole peak area, and M4 is a smallest peak top molecular weight among peak top molecular weights corresponding to peaks forming at least 15% of the whole peak area.

12. A linear block copolymer composition, comprising from 55 to 95 mass % of a vinyl aromatic hydrocarbon and from 5 to 45 mass % of a conjugated diene as monomer units; wherein:
the linear block copolymer composition is a mixture comprising linear block copolymers having at least three types of polymer blocks with different molecular weights represented by the following formula:

S—B—S where S is a polymer block comprising a vinyl aromatic hydrocarbon as monomer units, and B is a polymer block consisting of conjugated diene monomer units;
a molecular weight distribution (Mw/Mn) of a mixture of the polymer blocks is within a range of from 3.35 to 6;
in a gel permeation chromatogram of the mixture of the polymer blocks, M1/M2 is within a range of from 12.5 to 25, where M1 is a largest peak top molecular weight among peak top molecular weights corresponding to peaks forming at least 30% of a whole peak area, and M2 is a smallest peak top molecular weight among peak top molecular weights of 50,000 or less corresponding to peaks forming at least 20% of the whole peak area; and
the linear block copolymer composition is obtained by:
preparing a polymer system by carrying out anionic polymerization of a first charge of a vinyl aromatic and an initiator;
adding a second charge of a vinyl aromatic hydrocarbon and an initiator to the polymerization system;
adding a third charge of a vinyl aromatic hydrocarbon and an initiator to the polymerization system, the first, second, and third charges resulting in formation three types of vinyl aromatic hydrocarbon blocks having different peak top molecular weights;
adding a fourth charge of a conjugated diene;
adding a fifth charge of a vinyl aromatic hydrocarbon;
inactivating a portion of active terminals of the obtained polymers;
adding a sixth charge of a vinyl aromatic hydrocarbon; and
inactivating all remaining active terminals of the obtained polymers.

13. The linear block copolymer composition according to claim 12, wherein:
in a gel permeation chromatogram of a mixture of the polymer blocks, a proportion of a number of moles of S1 to a sum of the number of moles of S1 and a number of moles of S2 is within a range of from 5 to 25 mol %;
S1 is a component corresponding to the largest peak top molecular weight among peak top molecular weights corresponding to peaks forming at least 30% of the whole peak area; and
S2 is a component corresponding to the smallest peak top molecular weight among peak top molecular weights of 50,000 or less corresponding to peaks forming at least 20% of the whole peak area.

14. The linear block copolymer composition according to claim 12 or 13, wherein M2 is within a range of from 4,500 to 20,000.

15. The linear block copolymer composition according to claim 12, wherein M1 is within a range of from 90,000 to 200,000.

16. The linear block copolymer composition according to claim 12, wherein, in a gel permeation chromatogram of the linear block copolymer composition, a molecular weight distribution (Mw/Mn) of a component corresponding to a largest peak top molecular weight among peak top molecular weights corresponding to peaks forming at least 30% of the whole peak area, is less than 1.03.

17. The linear block copolymer composition according to claim 12, wherein, in a gel permeation chromatogram of the linear block copolymer composition, a peak top molecular weight of a component corresponding to a peak having a largest peak area is within a range of from 120,000 to 250,000.

18. A composition, comprising:
the linear block copolymer composition according to claim 12; and
a thermoplastic resin other than the linear block copolymer composition.

19. The composition according to claim 18, wherein a mass ratio of the linear block copolymer composition to the thermoplastic resin is from 30/70 to 70/30.

20. The composition according to claim 18, wherein the thermoplastic resin is a polystyrene polymer.

21. The composition according to claim 12, wherein the vinyl aromatic hydrocarbon monomer unit is styrene, and the conjugated diene monomer unit is butadiene.

22. The composition according to claim 12, wherein, in a gel permeation chromatogram of the linear block copolymer composition, M3/M4 is within a range of from 2.5 to 4.5, where M3 is a largest peak top molecular weight among peak top molecular weights corresponding to peaks forming at least 30% of a whole peak area, and M4 is a smallest peak top molecular weight among peak top molecular weights corresponding to peaks forming at least 15% of the whole peak area.

* * * * *